United States Patent
Takano et al.

(10) Patent No.: US 8,853,990 B2
(45) Date of Patent: Oct. 7, 2014

(54) INVERTER DEVICE OF ROTATING ELECTRICAL MACHINE, AND DRIVING METHOD FOR ROTATING ELECTRICAL MACHINE

(75) Inventors: Ryuji Takano, Kariya (JP); Yohei Yamada, Kariya (JP); Tomohiro Ohba, Kariya (JP); Shigeki Ikeda, Kariya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 247 days.

(21) Appl. No.: 13/414,443

(22) Filed: Mar. 7, 2012

(65) Prior Publication Data
US 2012/0235604 A1 Sep. 20, 2012

(30) Foreign Application Priority Data

Mar. 15, 2011 (JP) .................. 2011-056517

(51) Int. Cl.
*H02P 23/00* (2006.01)
(52) U.S. Cl.
USPC ............ 318/807; 318/798; 318/799; 318/810
(58) Field of Classification Search
USPC ................. 318/798, 799, 801, 807, 810, 811; 363/39, 40, 41, 95, 97, 98, 131, 132
See application file for complete search history.

(56) References Cited

U.S. PATENT DOCUMENTS

| | | | | |
|---|---|---|---|---|
| 4,716,347 | A * | 12/1987 | Fujimoto | 318/460 |
| 5,376,872 | A * | 12/1994 | Hara | 318/799 |
| 5,625,542 | A * | 4/1997 | Stemmler et al. | 363/41 |
| 6,819,077 | B1 * | 11/2004 | Seibel et al. | 318/801 |
| 7,423,401 | B2 * | 9/2008 | Kinpara et al. | 318/490 |
| 7,456,597 | B2 * | 11/2008 | Kanamori | 318/599 |
| 8,278,865 | B2 * | 10/2012 | Shimada et al. | 318/503 |

(Continued)

FOREIGN PATENT DOCUMENTS

| | | |
|---|---|---|
| DE | 100 19 374 C2 | 6/2003 |
| EP | 1 148 629 A2 | 10/2001 |

(Continued)

OTHER PUBLICATIONS

First German Office Action for corresponding German Patent Application No. 10 2012 203 684.9 issued on May 4, 2012. Partial Machine Translation.

(Continued)

*Primary Examiner* — Bentsu Ro
*Assistant Examiner* — Thai Dinh
(74) *Attorney, Agent, or Firm* — Sughrue Mion, PLLC

(57) ABSTRACT

An inverter device of a rotating electrical machine drives a multiphase rotating electrical machine having the variable number of rotations using a switching element provided for each phase. An example of the inverter device of the rotating electrical machine includes: a frequency setting unit for determining and setting a carrier frequency of a carrier signal for use in driving the switching element for each phase depending on the state of each phase of the rotating electrical machine for each specified electrical angle obtained by equally dividing a cycle of an electrical angle; and a signal generation unit for generating a drive signal for drive of the switching element of each phase using the carrier signal of the carrier frequency set for each phase by the frequency setting unit. The carrier frequency of each phase is an integral multiple of the phase voltage frequency at the specified electrical angle.

5 Claims, 4 Drawing Sheets

(56) References Cited

U.S. PATENT DOCUMENTS

| | | | |
|---|---|---|---|
| 8,519,653 B2* | 8/2013 | Takamatsu et al. | 318/400.26 |
| 2010/0020572 A1 | 1/2010 | Hashimoto et al. | |
| 2010/0185350 A1* | 7/2010 | Okamura et al. | 701/22 |

FOREIGN PATENT DOCUMENTS

| | | | |
|---|---|---|---|
| EP | 1 148 629 A3 | | 7/2002 |
| EP | 1 148 629 B1 | | 2/2004 |
| JP | 05-022950 A | | 1/1993 |
| JP | 09-047026 A | | 2/1997 |
| JP | 9-47026 A | | 2/1997 |
| JP | 09047026 A | * | 2/1997 |
| JP | 2006-217776 A | | 8/2006 |
| JP | 2006217776 A | * | 8/2006 |
| JP | 2007-228745 A | | 9/2007 |
| JP | 2008-206293 A | | 9/2008 |
| JP | 2010-35260 A | | 2/2010 |

OTHER PUBLICATIONS

English machine translation of JP 2007-228745 a which was previously submitted on Mar. 7, 2012.

Japanese Office Action for corresponding JP Patent Application No. 2011-05651 7 mailed Feb. 26, 2013.

Japanese Office Action dated Dec. 10, 2013 issued in corresponding Japanese Patent Application No. 2011-056517.

* cited by examiner

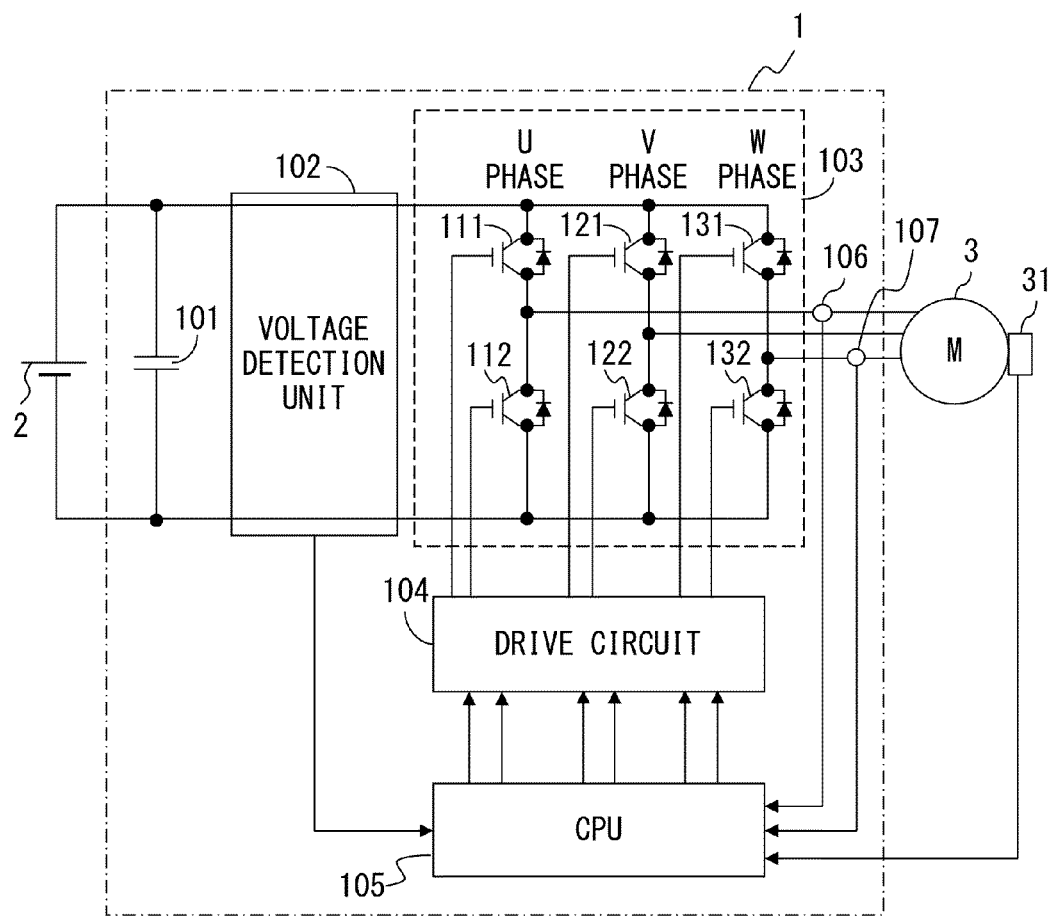
F I G. 1

INVERTER DEVICE OF ROTATING ELECTRICAL MACHINE, AND DRIVING METHOD FOR ROTATING ELECTRICAL MACHINE

BACKGROUND OF THE INVENTION

1. Field of the Invention

The present invention relates to the technology of driving a rotating electrical machine by supplying a current for each phase.

2. Description of the Related Art

Normally, an inverter device is used in driving a rotating electrical machine such as a 3-phase motor. The inverter device is normally provided with two switching elements for each phase (a total of 6 elements). Thus, the inverter device controls the driving voltages of three phases by driving on and off the six switching elements, thereby generating a rotating magnetic field for the rotating electrical machine. The inverter device of the rotating electrical machine is to drive the rotating electrical machine using the switching elements.

As a method for controlling the level of the voltage to be applied to a rotating electrical machine and the frequency, PWM control drives on and off the switching element for each phase, and applies a voltage of any pulse width. The PWM control normally compares a carrier signal with a specified command voltage value, and sets the level of the driving voltage at an H (high) or an L (low) level (carrier synchronization method) depending on the comparison result.

In the PWM control, the switching frequency at which the switching elements are driven on and off depends on the carrier frequency. When a switching loss is considered, it is preferable that the switching frequency is lower. The switching frequency can be lower by setting a lower carrier frequency. Therefore, some conventional inverter devices of rotating electrical machine change the carrier frequency depending on the inclination of the reference sine wave signal used in providing a command voltage value (Japanese Laid-open Patent Publication No. 2010-35260, hereafter referred to as the "patent document 1").

In the conventional inverter device described in the patent document 1, the carrier frequency is changed depending on the inclination of the reference sine wave signal. Therefore, complicated control is performed. In addition, since the frequency of an output waveform is to be fixed, the synchronous PWM control cannot be executed when the frequency is variable. Therefore, it is also important to realize the switching loss without narrowing the width of options in the control method while suppressing the complexity of the control.

Other reference documents can be Japanese Laid-open Patent Publication No. 2007-228745 and Japanese Laid-open Patent Publication No. 9-47026.

SUMMARY OF THE INVENTION

The present invention aims at providing an inverter device of a rotating electrical machine capable of reducing a switching loss while suppressing the complexity of control.

An aspect of the present invention includes on assumption that a multiphase rotating electrical machine having the variable number of rotations is driven using a switching element provided for each phase: a frequency setting unit for determining and setting a carrier frequency of a carrier signal for use in driving a switching element for each phase depending on the state of each phase of the rotating electrical machine for each specified electrical angle obtained by equally dividing the cycle of an electrical angle; and a signal generation unit for generating a drive signal for drive of the switching element of each phase using the carrier signal of the carrier frequency set for each phase by the frequency setting unit. It is assumed that the carrier frequency of each phase is an integral multiple of the phase voltage frequency at the specified electrical angle.

It is preferable that the frequency setting unit determines the carrier frequency for each phase depending on the phase of the current of each phase as the state of each phase of the rotating electrical machine. It is also preferable that the rotating electrical machine is a 3-phase machine, and is 2-phase modulation controlled.

Another aspect of the present invention includes on assumption that the rotating electrical machine is driven using a switching element provided for each phase: determining a carrier frequency of a carrier signal for use in driving the switching element for each phase depending on the state of each phase of the rotating electrical machine for each electrical angle obtained by equally dividing the cycle of an electrical angle; generating a drive signal for drive of the switching element of each phase using the carrier signal of the carrier frequency determined for each phase; and setting the carrier frequency of each phase as an integral multiple of a phase voltage frequency at the specified electrical angle.

BRIEF DESCRIPTION OF THE DRAWINGS

FIG. 1 is an explanatory view of the configuration of the inverter device of a rotating electrical machine according to an embodiment of the present invention;

DESCRIPTION OF THE PREFERRED EMBODIMENTS

Figure 2:
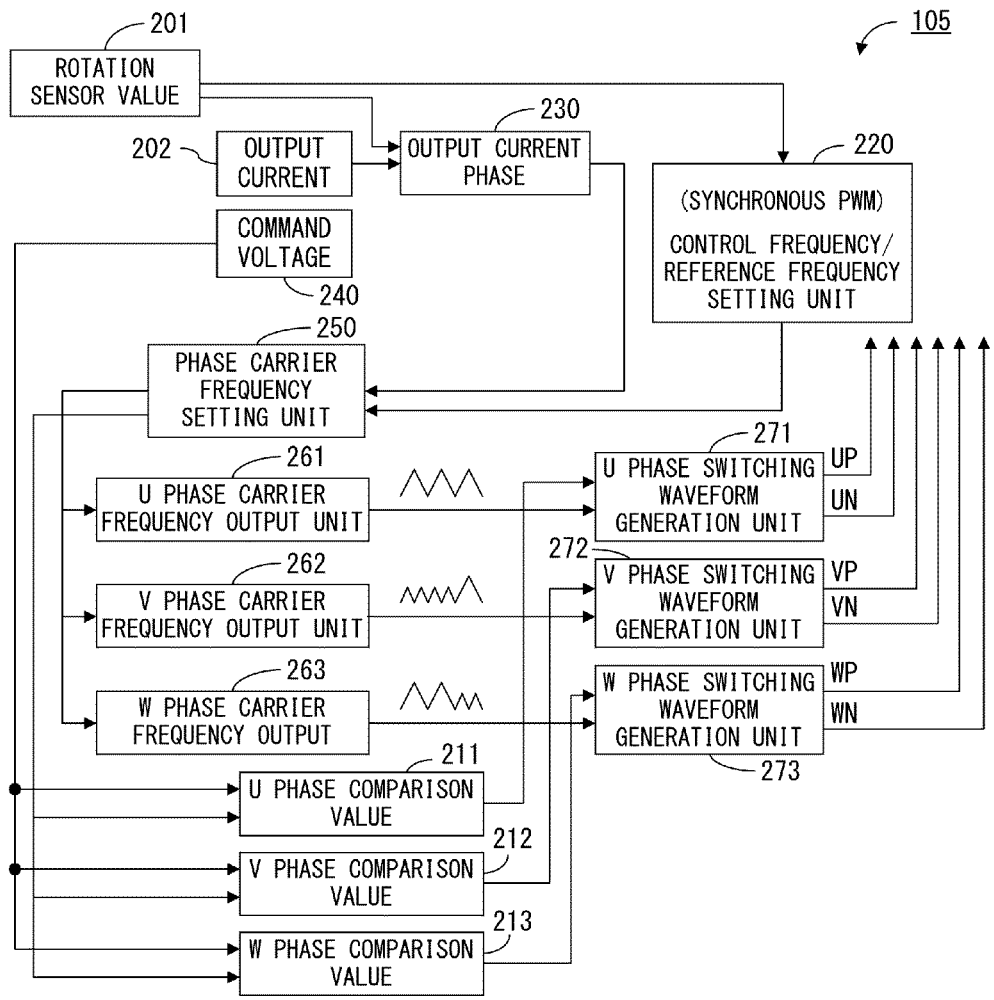
FIG. 2 is an explanatory view of the configuration of the function of the CPU provided for the inverter device of a rotating electrical machine according to an embodiment of the present invention.

The embodiment of the present invention is described below with reference to the attached drawings.

FIG. 1 is an explanatory view of the configuration of the inverter device of a rotating electrical machine according to the present embodiment.

An inverter device 1 of the rotating electrical machine (hereafter referred to as an "inverter device") drives a motor 3 as a rotating electrical machine using the voltage applied from a DC power supply 2. As illustrated in FIG. 1, the inverter device 1 includes a capacitor 101 connected in parallel to the DC power supply 2, a voltage detection unit 102 for detecting the voltage between the both ends of the capacitor 101, an inverter circuit 103 for which, for example, an n-channel IGBT (insulated gate bipolar transistor) is prepared as two switching elements for each phase, a drive circuit 104 for generating and outputting a drive signal of each IGBT of the inverter circuit 103, a CPU 105 for controlling the generation of drive signals by the drive circuit 104, and two current sensors 106 and 107.

The motor 3 is a rotating electrical machine driven by supplying a 3-phase current. The motor 3 is loaded with a rotation sensor 31 for which the position of a rotor not illustrated in the attached drawings can be designated by an electrical angle. The value detected by the rotation sensor 31 (hereafter referred to as a "rotation sensor value") is input to the CPU 105. The rotating electrical machine is a machine which can be driven by supplying a current for a plurality of phases.

To the inverter circuit 103, two serial IGBTs are connected in parallel to the capacitor 101 for each phase. Thus, for example, for the U phase, the collector of an IGBT 111 is connected to one terminal of the capacitor 101, the emitter of the IGBT 111 is connected to the collector of the IGBT 112, and the emitter of the IGBT 112 is connected to the other terminal of the capacitor 101. IGBTs 121 and 122 for the V phase, and IGBTs 131 and 132 for the W phase are similarly connected.

In the inverter circuit 103 above, the voltage of the wiring for connection of the IGBTs 111 and 112 is applied as a U-phase voltage to the motor 3. Similarly, the voltage of the wiring for connection of the IGBTs 121 and 122 is applied as a V-phase voltage to the motor 3. The voltage of the wiring for connection of the IGBTs 131 and 132 is applied as a W-phase voltage to the motor 3. Thus, the current sensor 106 and the current sensor 107 respectively outputs to the CPU 105 the values indicating the U-phase current and the W-phase current. Hereafter, the drive signal input to the gate of each of the IGBTs 111, 112, 121, 122, 131, and 132 is called a "UP signal", "UN signal", "VP signal", "VN signal", "WP signal", and "WN signal". The "UP signal", "VP signal", and "WP signal" are generally called a "P signal", and the "UN signal", "VN signal", and "WN signal" are generally called a "N signal".

The CPU 105 controls the entire inverter device 1 by executing the program stored in the loaded memory or in the connected memory not illustrated in the attached drawings respectively. In the present embodiment, the carrier frequency of each phase is determined and set for each specified electrical angle by monitoring the rotation sensor value acquired from the rotation sensor 31. Thus, the CPU 105 functions as a frequency setting unit. The determination is performed based on the state of each phase.

The CPU 105 generates for each IGBT a drive signal for each phase using the carrier frequency set for each phase, and outputs the signal to the drive circuit 104. The drive circuit 104 amplifies each drive signal input from the CPU 105, and outputs the signal to the gate of the corresponding IGBT. Thus, the CPU 105 and the drive circuit 104 function as signal generation unit for generating a drive signal output to each IGBT as a switching element.

In the present embodiment, the current phase is considered as a state of each phase. Thus, a carrier frequency is set lower for a phase whose absolute value of the current value is relatively large, and is set higher for a phase whose absolute value of the current value is relatively small. By thus setting the carrier frequency, the switching frequency is reduced in an area where the absolute value of the current value is large, thereby efficiently reducing the switching loss. Therefore, the switching loss can be more successfully suppressed. Furthermore, the current change is small in a phase where the absolute value of the current value is relatively large, and the current change is large in a phase where the absolute value of the current value is relatively small. Therefore, the carrier frequency becomes high in a phase in which a current change is large, thereby guaranteeing the controllability.

Figure 3A:
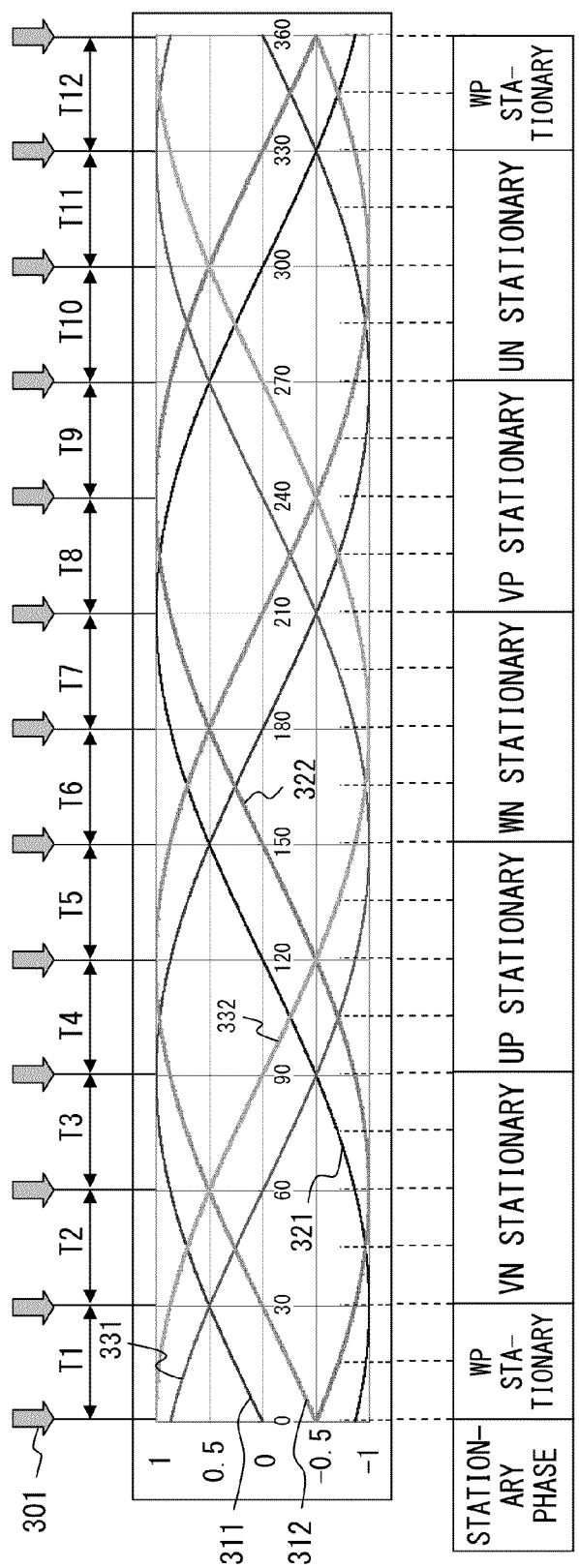
FIG. 3A is an explanatory view of the drive control of the motor performed by the inverter device of the rotating electrical machine according to an embodiment of the present invention (1).
Figure 3B:
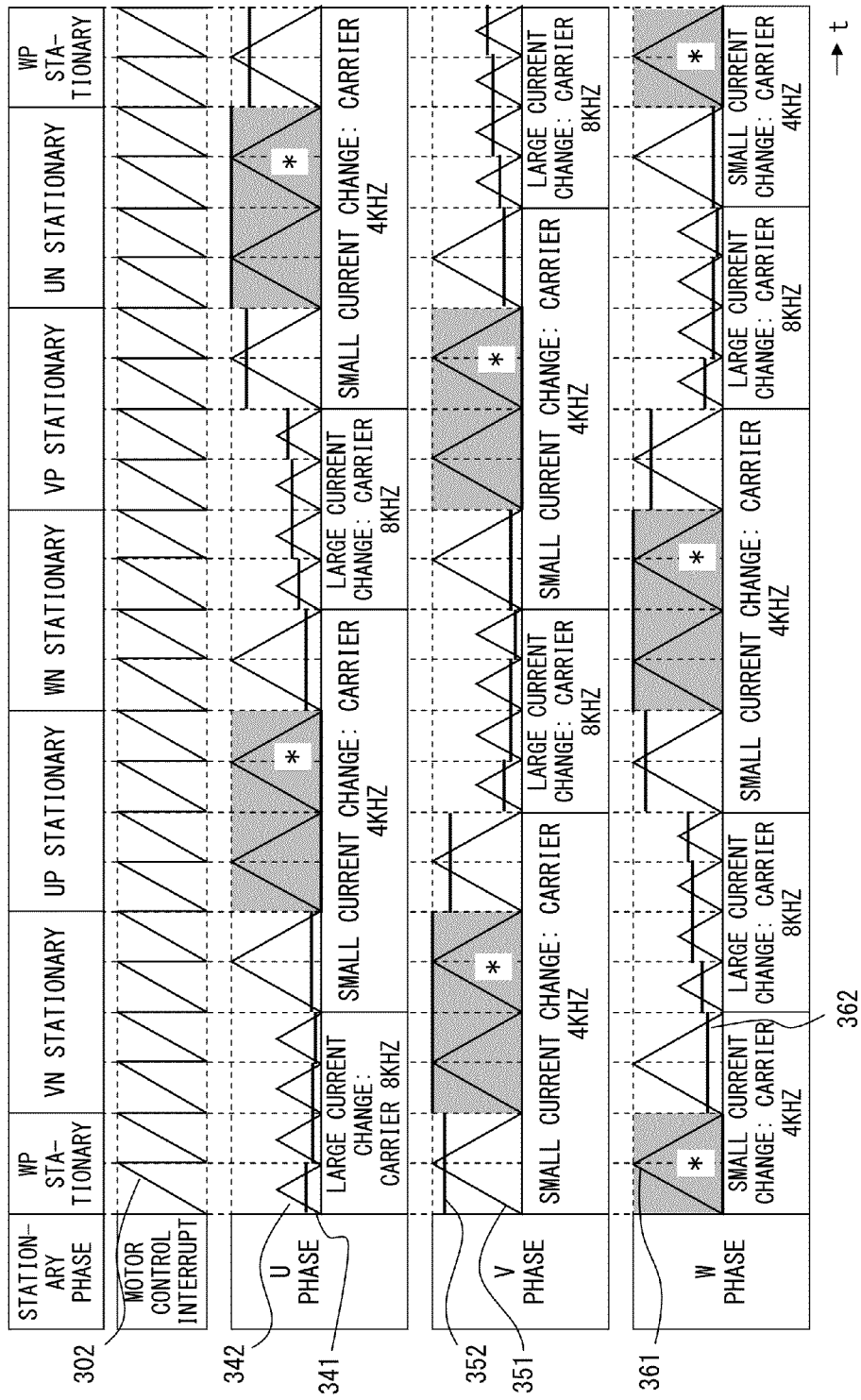
FIG. 3B is an explanatory view of the drive control of the motor performed by the inverter device of the rotating electrical machine according to an embodiment of the present invention (2).

FIG. 2 is an explanatory view of the configuration of the function of the CPU 105 above. FIGS. 3A and 3B are an explanatory view of the drive control of the motor 3. Before explaining FIG. 2, the drive control of the motor 3 according to the present embodiment is concretely explained with reference to FIGS. 3A and 3B.

FIG. 3A illustrates a U phase voltage waveform 311, a U phase current waveform 312, a V phase voltage waveform 321, a V phase current waveform 322, a W phase voltage waveform 331, and a W phase current waveform 332. These waveforms are expressed by the horizontal axis as an electrical angle (degrees) and the vertical axis as a current value and a voltage value.

An arrow 301 indicates the timing with which a carrier frequency is calculated. A saw tooth waveform 302 indicates the occurrence timing of an interrupt signal (expressed as the "motor control interrupt" in FIG. 3B) for control of the motor 3. The determination of the carrier frequency is performed at each peak of the saw tooth waveform 302 by the occurrence of the interrupt signal.

In FIG. 3A, a total of 13 arrows 301 are expressed. It indicates with the arrow 301 and the saw tooth waveform 302 that the carrier frequency is calculated in each area obtained by dividing one rotation of the rotor of the motor 3 into 12 sections, and the calculated carrier frequency is set (motor control interrupt) twice in each area.

When time period T1 through T12 are obtained by dividing one rotation of the rotor equally into 12 sections as according to the present embodiment, they correspond to the changes of the electrical angle of 30° (deg). Thus, the carrier frequency is calculated each time the electrical angle changes by 30°. The carrier frequency can be set each time the electrical angle changes by 15°. Therefore, FIG. 3B illustrates the broken lines indicating the voltage phase area below the saw tooth waveform 302, that is, one cycle of the saw tooth waveform 302.

A carrier signal 341 is set and applied to the U phase. According to the present embodiment, two types of carrier signal 341 have the same inclination and different amplitudes (height) because the inclination of the carrier signal 341 is fixed. Therefore, the amplitude (height) of the carrier signal 341 is determined by the frequency (carrier frequency). That is, in two types of the carrier signal 341, the frequency ratio of the two sections whose amplitudes are 1:2 is 2:1. In FIG. 3B, the section having a larger amplitude is 4 KHz, and the section having a smaller amplitude is 8 KHz. "stationary phase" are illustrated in FIGS. 3A and 3B to make the time correspondency between various waveform illustrating in FIG. 3A and various waveform illustrating in FIG. 3B. "stationary phase" is described later.

The carrier frequency is calculated and set by each phase. The carrier frequency of each phase can include the cycle for an integer in the time period until the carrier frequency is next calculated. Accordingly, in each phase where, for example, the electrical angle is 0°, if the frequency of the phase voltage (for example, the U phase voltage waveform 311) as the motor voltage waveform if fm (phase voltage frequency), and the calculation frequency of the carrier frequency per cycle of fm is K (specified integer equal to or exceeding 1), then the time period T1 satisfies the following equation.

$$T1 = (1/fm)/K$$

In the case illustrated in FIG. 3A, K equals 12. (If K is too small, it is hard to change the carrier frequency into an appropriate value. For example, if it is 4, the electrical angle is 90°, but a larger value is desired. 12 or a larger value is also accepted.)

If the carrier frequency of the U phase in the period T1, that is, in the period of the electrical angle of 0~30° is fc1, then the carrier frequency fc1 can be calculated by the following equation:

$$fc1=(1/T1) \times n = fm \times K \times n$$

where n indicates the number of carrier frequencies which can be included in the time period T1, and the method of determining the value is described later. As indicated by the equation, the carrier frequency is an integral multiple of the phase voltage frequency fm on the calculation timing (specified electrical angle: timing of arrow 301) of the carrier frequency. The frequency of the saw tooth waveform 302 changes depending on the frequency fm of the motor voltage waveform.

The calculation above is performed for each phase, and repeated with the calculation timing of the carrier frequency. Therefore, the change of the rotation speed of the motor 3 (frequency of sine wave waveform for use in setting command voltage value: change of phase voltage frequency fm) can also be supported, thereby guaranteeing higher applicability.

Described next is the method of determining n. The character n is an integer to be specified from the electrical angle (phase) of the current waveform of each phase. Since the waveform (for example, sin wave) of the current waveform is known in advance, the absolute value of the current waveform (amount of current) is known from the phase. Then, the carrier frequency fc is reduced to decrease the switching frequency at the point where, for example, the amount of current is large, that is, the value of n is set as a small value. That is, the phase of the current waveform is compared with a preset phase range, and the value of n is selected depending on the comparison result. Although the carrier frequency is changed by setting the value n as an integer equal to or exceeding 1, the synchronous PWM control can be constantly performed. The value n can be determined from the absolute value itself of a current value instead of the phase of a current waveform.

In the example illustrated in FIGS. 3A and 3B, n is set as 2 (n=2) when the amount of current is small (phase of less than 0.5 when the absolute value of the maximum amplitude is 1), and n is set as 1 (n=1) when the amount of current is large (phase of 0.5 or more). In the present embodiment, the carrier frequency is changed in 2 stages where n=1 or 2, but can also be changed in 3 stages or more.

Described next is the method of generating an ON/OFF signal from the calculated carrier frequency fc. In the present embodiment, so-called 2-phase modulation control is adopted. In the U phase in FIG. 3B, the straight line 342 with the carrier signal 341 refers to the command voltage value of the U phase. The straight line 342 is a representative value of the U phase voltage waveform 311 on the corresponding to the period, and a value of, for example, an average value or a value of calculation timing of the carrier frequency. In the example in FIGS. 3A and 3B, the level of the command voltage value 342 is inverted from the voltage command value 311. The UP signal and the UN signal are generated by the comparison between the command voltage value (straight line 342) and the carrier signal 341. In the example in FIGS. 3A and 3B, the UP signal is ON (active: the H level in this example) only where the carrier signal 341 is equal to or exceeding the command voltage value 342, and the UN signal is ON where the carrier signal 341 is less than the command voltage value 342.

Since the absolute value of the U-phase current is large in the period in which the electrical angle is 90° through 150°, the command value voltage 342 is adjusted so that the carrier signal 341 can be constantly more than the command voltage value 342. Simultaneously, the command voltage values 352 and 362 of the V and W phases respectively are adjusted to keep the inter-phase voltage with the command voltage 342. Thus, in the period of the electrical angle 90° through 150°, the UP signal is constantly ON, that is, the IGBT 111 is constantly ON. On the other hand, since the absolute value of the U-phase current is large in the period in which the electrical angle is 270° through 330°, the command value voltage 342 is adjusted so that the carrier signal 341 can be constantly equal or lower than the command voltage value 342. Simultaneously, the command voltage values 352 and 362 of the V and W phases respectively are adjusted to keep the inter-phase voltage with the command voltage 342. Thus, the UN signal is constantly ON, that is, the IGBT 112 is constantly ON.

In this example, the term "stationary" indicates the state in which, in the two in-phase IGBTs, the lower arm corresponding to the UN signal keeps ON and the upper arm corresponding to the UP signal keeps OFF, or the upper arm keeps ON and the lower arm keeps OFF. To prevent a short circuit, the two IGBTs do not simultaneously indicate ON. The "UP stationary" and "UN stationary" expressed as above "stationary phase" in FIGS. 3A and 3B respectively indicate the state in which the IGBT 111 of the U phase is stationary by the UP signal as ON, and the state in which the IGBT 112 of the U phase is stationary by the UN signal as ON. Likewise, the "VP stationary" and "VN stationary" respectively indicate the state in which the IGBT 121 of the V phase is stationary by the VP signal as ON, and the state in which the IGBT 122 of the V phase is stationary by the VN signal as ON. The "WP stationary" and "WN stationary" respectively indicate the state in which the IGBT 131 of the W phase is stationary by the WP signal as ON, and the state in which the IGBT 132 of the W phase is stationary by the WN signal as ON.

In the UP stationary and the UN stationary, the switching of the IGBTs 111 and 112, that is, the change from ON to OFF or from OFF to ON does not occur. The UP stationary is realized when the command voltage value of the U phase current waveform 312 is large, and the UN stationary is realized when the current value of the U phase current waveform 312 is small. In either state, the absolute value of the current value is large. Since the switching does not occur in such a state, the switching loss can be efficiently suppressed.

A carrier signal 351 is set and applied for the V phase, and a carrier signal 361 is set and applied for the W phase. A command voltage value 352 is used for the V phase, and a command voltage value 362 is used for the W phase. A stationary state occurs in the V and W phases similarly in the U phase. Therefore, the occurrence of a switching loss can be efficiently suppressed in the V and W phases similarly in the U phase.

In the present embodiment, as described above, the carrier frequency in each phase is calculated for each of the specified electrical angles (for each calculation timing of a carrier frequency), and the calculated carrier frequency is applied for each phase until the next specified electrical angle is acquired, and the motor 3 is driven. Thus, the switching in the period in which the switching loss is close to maximum value is avoided, thereby efficiently reducing the switching loss.

In the present embodiment, a 2-phase modulation is adopted and the carrier frequency can be calculated in each area obtained by dividing one rotation of the rotor of the motor 3 into 12 sections (=2×3×M (integer)). However, the modulation is not limited to the 2-phase modulation. For example, a 3-phase modulation can be adopted to suppress the occurrence of a switching loss.

Next, the configuration of the function of the CPU 105 for realizing the drive control of the above-mentioned motor 3 is also described in detail with reference to FIG. 2. The configuration of the function is realized by the CPU 105 executing the program stored in the memory not illustrated in the attached drawings but loaded on or connected to the CPU as described above.

The rotation sensor value obtained from the rotation sensor 31 of the motor 3 is stored in a register 201, and each current value in the U and W phases obtained from the current sensors 106 and 107 is stored in a register 202.

A control frequency setting unit 220 refers to a rotation sensor value of the register 201 at any time, recognizes the arrival of the timing indicated by the arrow 301 in FIG. 3A (specified electrical angle), and obtains the fm at the time point, thereby designating the period (for example, T1 when the electrical angle is 0) for control.

An output current phase designation unit 230 recognizes the arrival of the timing indicated by the 301 in FIG. 3A (specified electrical angle) from the rotation sensor value stored in the register 201, refers to the current value in the U phase and/or the W phase stored in the register 202, and designates the current phase of each phase. The designated current phase of each phase is reported to a phase carrier frequency setting unit 250.

The phase carrier frequency setting unit 250 of each phase sets the value of n from the current phase of each phase reported from the output current phase designation unit 230, and obtains the value of fm from the control frequency setting unit 220, thereby determining the carrier frequency for each phase. The carrier frequency determined for each phase is set for a U phase carrier frequency output unit 261, a V phase carrier frequency output unit 262, and a W phase carrier frequency output unit 263. Each of the carrier frequency output units 261, 262, and 263 outputs a carrier signal of the determined carrier frequency.

A command voltage setting unit 240 outputs a command voltage value for each phase to a comparison value output unit 211, a comparison value output unit 212, and a comparison value output unit 213. Each of the comparison value output units 211 through 213 inputs a carrier frequency of a corresponding phase from the phase carrier frequency setting unit 250. Thus, each of the comparison value output units 211 through 213 performs a multiplication using a command voltage value input from the command voltage setting unit 240 depending on the carrier frequency set by corresponding phase, and outputs the multiplication result. The multiplication result is processed as a command voltage value to be compared with a carrier signal.

As illustrated in FIG. 3B, the carrier signals 341, 351, and 361 are different in amplitude depending on the carrier frequency. Therefore, for example, when the command voltage setting unit 240 outputs a command voltage value for an assumed lower carrier frequency, the comparison value output unit 211, 212, or 213 of the phase for which a lower carrier frequency is set outputs a value corresponding to the carrier signal of the lower carrier frequency. Similarly, the comparison value output unit 211, 212, or 213 of the phase on which a higher carrier frequency is set outputs a value corresponding to a carrier signal of the higher carrier frequency. Thus, the comparison value output units 211, 212, and 213 outputs a command voltage value corresponding to a set carrier frequency. That is, a command voltage value is adjusted depending on the amplitude of the carrier signal of each phase. Furthermore, for the 2-phase modulation, a stationary phase is determined based on the output current phase, and the command voltage value is adjusted to maintain the relative voltage between the phases.

A U phase switching waveform generation unit 271 inputs a carrier signal from the U phase carrier frequency output unit 261 and a command voltage value from the U phase comparison value output unit 211, compares them, generates and outputs two switching waveforms for the UP signal and the UN signal. By inputting the switching waveforms to the drive circuit 104, the drive circuit 104 outputs the UP signal and the UN signal.

Likewise, a V phase switching waveform generation unit 272 inputs a carrier signal from the V phase carrier frequency output unit 262 and a command voltage value from the V phase comparison value output unit 212, compares them, and generates and outputs two switching waveforms for the VP signal and the VN signal. A W phase switching waveform generation unit 273 inputs a carrier signal from the W phase carrier frequency output unit 263 and a command voltage value from the W phase comparison value output unit 213, compares them, and generates and outputs two switching waveforms for the WP signal and the WN signal. By inputting the two types of switching waveforms generated by the V phase switching waveform generation unit 272 and the W phase switching waveform generation unit 273 to the drive circuit 104, the drive circuit 104 outputs the VP signal, the VN signal, the WP signal, and the WN signal.

The command voltage setting unit 240 outputs the command voltage values corresponding to the respective phases to the comparison value output units 211 through 213, and the comparison value output units 211 through 213 update the command voltage values to be output by the input of the command voltage value.

In the present embodiment, the current phase is considered, and the carrier frequency of each phase is determined. However, the voltage phase can be considered to determine the carrier frequency of each phase. There is a phase difference designated by a power factor between the current waveform and the voltage waveform. Thus, the process on the voltage waveform can be performed by, for example, allowing the output current phase designation unit 230 in FIG. 2 to designate a voltage waveform using the power factor from the designated current phase.

What is claimed is:

1. An inverter device which drives a multiphase rotating electrical machine having a variable number of rotations using a switching element provided for each phase, comprising:

a frequency setting unit determining and setting a carrier frequency of a carrier signal for use in driving the switching element for each phase depending on a state of each phase of the rotating electrical machine for each specified electrical angle, the specified electrical angle determined by equally dividing one rotation of an electrical angle, wherein the determination and setting of the carrier frequency is conducted each time the electrical angle changes by the specified electrical angle; and a signal generation unit generating a drive signal for drive of the switching element of each phase using the carrier signal of the carrier frequency set for each phase by the frequency setting unit, wherein the carrier frequency of each phase is an integral multiple of a phase voltage frequency at the specified electrical angle.

2. The inverter device according to claim 1, wherein
the frequency setting unit determines the carrier frequency for each phase depending on the phase of the current of each phase as the state of each phase of the rotating electrical machine.

3. The inverter device according to claim 1, wherein
the rotating electrical machine is a 3-phase machine, and is 2-phase modulation controlled.

4. A driving method of a rotating electrical machine using a switching element provided for each phase, comprising:
   determining a carrier frequency of a carrier signal for use in driving a switching element is generated for each phase depending on a state of each phase of a rotating electrical machine for each electrical angle, the specified electrical angle determined by equally dividing one rotation of an electrical angle, wherein the determination of the carrier frequency is conducted each time the electrical angle changes by the specified electrical angle;
   generating a drive signal for drive of a switching element of each phase using a carrier signal of a carrier frequency determined for each phase; and
   setting the carrier frequency of each phase as an integral multiple of a phase voltage frequency at a specified electrical angle.

5. The inverter device according to claim 2, wherein
   the rotating electrical machine is a 3-phase machine, and is 2-phase modulation controlled.

* * * * *